United States Patent
Moreman et al.

(10) Patent No.: US 9,015,555 B2
(45) Date of Patent: Apr. 21, 2015

(54) SYSTEM AND METHOD FOR MULTICAST ERROR RECOVERY USING SAMPLED FEEDBACK

(75) Inventors: Charles Moreman, Grayson, GA (US); William C. VerSteeg, Buford, GA (US)

(73) Assignee: Cisco Technology, Inc., San Jose, CA (US)

( * ) Notice: Subject to any disclaimer, the term of this patent is extended or adjusted under 35 U.S.C. 154(b) by 159 days.

(21) Appl. No.: 13/300,338

(22) Filed: Nov. 18, 2011

(65) Prior Publication Data

US 2013/0132807 A1 May 23, 2013

(51) Int. Cl.
*H03M 13/00* (2006.01)
*G06F 11/00* (2006.01)
*H04L 1/18* (2006.01)
*H04N 21/6375* (2011.01)
*H04L 1/00* (2006.01)

(52) U.S. Cl.
CPC .......... *H04L 1/1816* (2013.01); *H04N 21/6375* (2013.01); *H04L 1/1854* (2013.01); *H04L 1/1896* (2013.01); *H04L 2001/0093* (2013.01); *H04L 1/0045* (2013.01)

(58) Field of Classification Search
CPC ...... G06F 11/10; G06F 11/004; H03M 13/09; H04L 65/00; H04L 43/16; H04L 43/0823; H04L 43/08; H04L 1/809; H04N 21/6375
USPC .................................................. 714/704, 760
See application file for complete search history.

(56) References Cited

U.S. PATENT DOCUMENTS

| | | |
|---|---|---|
| 5,483,587 A | 1/1996 | Hogan et al. |
| 5,572,347 A | 11/1996 | Burton et al. |
| 5,594,509 A | 1/1997 | Florin et al. |
| 5,600,366 A | 2/1997 | Schulman |
| 5,600,663 A | 2/1997 | Ayanoglu et al. |
| 5,633,683 A | 5/1997 | Rosengren et al. |
| 5,673,253 A | 9/1997 | Shaffer |

(Continued)

FOREIGN PATENT DOCUMENTS

| | | |
|---|---|---|
| EP | 1553735 | 7/2005 |
| WO | WO 99/09741 | 2/1999 |

(Continued)

OTHER PUBLICATIONS

Zhi Li; Xiaoqing Zhu; Begen, A.C.; Girod, B., "Forward and retransmitted Systematic Lossy Error Protection for IPTV video multicast," Packet Video Workshop, 2009. PV 2009. 17th International, vol., no., pp. 1,9, May 11-12, 2009.*

(Continued)

*Primary Examiner* — Cynthia Britt
(74) *Attorney, Agent, or Firm* — Patent Capital Group

(57) ABSTRACT

A method is provided in one example and includes receiving a data stream that includes an error code probability; detecting an error in the data stream; and determining whether to generate an error signal for the error in the data stream based on the error code probability being compared to a threshold value. In more particular embodiments, the error code probability may be based on a total number of network elements that receive the data stream. In addition, more specific methodologies may include generating a number to be used as a basis for the threshold value; and generating the error signal if the error code probability is below the threshold value.

20 Claims, 6 Drawing Sheets

(56) References Cited

U.S. PATENT DOCUMENTS

| | | |
|---|---|---|
| 5,687,167 A | 11/1997 | Bertin et al. |
| 5,699,365 A | 12/1997 | Klayman et al. |
| 5,699,369 A | 12/1997 | Guha |
| 5,729,687 A | 3/1998 | Rothrock et al. |
| 5,790,546 A | 8/1998 | Dobbins et al. |
| 5,793,436 A | 8/1998 | Kim |
| 5,808,662 A | 9/1998 | Kinney et al. |
| 5,815,145 A | 9/1998 | Matthews |
| 5,870,087 A | 2/1999 | Chau |
| 5,913,031 A | 6/1999 | Blanchard |
| 5,949,795 A | 9/1999 | Moroney et al. |
| 5,963,217 A | 10/1999 | Grayson et al. |
| 6,016,166 A | 1/2000 | Huang et al. |
| 6,034,746 A | 3/2000 | Desai et al. |
| 6,065,050 A | 5/2000 | DeMoney |
| 6,101,221 A | 8/2000 | Varanasi et al. |
| 6,118,498 A | 9/2000 | Reitmeier |
| 6,119,092 A | 9/2000 | Patwardhan et al. |
| 6,137,834 A | 10/2000 | Wine et al. |
| 6,141,324 A | 10/2000 | Abbott et al. |
| 6,151,636 A | 11/2000 | Schuster et al. |
| 6,173,115 B1 | 1/2001 | Willis |
| 6,236,854 B1 | 5/2001 | Bradshaw |
| 6,252,849 B1 | 6/2001 | Rom et al. |
| 6,278,716 B1 | 8/2001 | Rubenstein et al. |
| 6,289,054 B1 | 9/2001 | Rhee |
| 6,307,839 B1 | 10/2001 | Gerszberg et al. |
| 6,310,918 B1 | 10/2001 | Saha et al. |
| 6,332,153 B1 | 12/2001 | Cohen |
| 6,453,471 B1 | 9/2002 | Klosterman |
| 6,480,541 B1 | 11/2002 | Girod et al. |
| 6,501,739 B1 | 12/2002 | Cohen |
| 6,510,553 B1 | 1/2003 | Hazra |
| 6,538,992 B1 | 3/2003 | Subbiah et al. |
| 6,567,929 B1 | 5/2003 | Bhagavath et al. |
| 6,570,926 B1 | 5/2003 | Agrawal et al. |
| 6,594,798 B1 | 7/2003 | Chou et al. |
| 6,608,820 B1 | 8/2003 | Bradshaw |
| 6,624,841 B1 | 9/2003 | Buchner et al. |
| 6,628,301 B1 | 9/2003 | Acton et al. |
| 6,643,496 B1 | 11/2003 | Shimoyama et al. |
| 6,650,652 B1 | 11/2003 | Valencia |
| 6,665,751 B1 | 12/2003 | Chen et al. |
| 6,671,262 B1 | 12/2003 | Kung et al. |
| 6,675,216 B1 | 1/2004 | Quatrano et al. |
| 6,678,332 B1 | 1/2004 | Gardere et al. |
| 6,701,528 B1 | 3/2004 | Arsenault et al. |
| 6,721,290 B1 | 4/2004 | Kondylis et al. |
| 6,735,572 B2 | 5/2004 | Landesmann |
| 6,744,785 B2 | 6/2004 | Robinett et al. |
| 6,763,019 B2 | 7/2004 | Mehta et al. |
| 6,771,644 B1 | 8/2004 | Brassil et al. |
| 6,775,247 B1 | 8/2004 | Shaffer et al. |
| 6,782,490 B2 | 8/2004 | Maxemchuk et al. |
| 6,792,047 B1 | 9/2004 | Bixby et al. |
| 6,816,469 B1 | 11/2004 | Kung et al. |
| 6,865,157 B1 | 3/2005 | Scott et al. |
| 6,865,540 B1 | 3/2005 | Faber et al. |
| 6,871,006 B1 | 3/2005 | Oguz et al. |
| 6,876,734 B1 | 4/2005 | Summers et al. |
| 6,925,068 B1 | 8/2005 | Stanwood et al. |
| 6,931,001 B2 | 8/2005 | Deng |
| 6,931,113 B2 | 8/2005 | Ortel |
| 6,937,569 B1 | 8/2005 | Sarkar et al. |
| 6,947,417 B2 | 9/2005 | Laursen et al. |
| 6,956,828 B2 | 10/2005 | Simard et al. |
| 6,959,075 B2 | 10/2005 | Cutaia et al. |
| 6,973,667 B2 | 12/2005 | Fritsch |
| 6,976,055 B1 | 12/2005 | Shaffer et al. |
| 6,989,856 B2 | 1/2006 | Firestone et al. |
| 7,003,086 B1 | 2/2006 | Shaffer et al. |
| 7,007,098 B1 | 2/2006 | Smyth et al. |
| 7,017,102 B1 | 3/2006 | Krisensson et al. |
| 7,054,643 B2 | 5/2006 | Trossen et al. |
| 7,065,779 B1 | 6/2006 | Crocker et al. |
| 7,073,117 B1 | 7/2006 | Ireland et al. |
| 7,084,898 B1 | 8/2006 | Firestone et al. |
| 7,096,481 B1 | 8/2006 | Forecast et al. |
| 7,113,484 B1 | 9/2006 | Chapman et al. |
| 7,114,172 B2 | 9/2006 | Lord |
| 7,127,487 B1 | 10/2006 | Wang et al. |
| 7,228,356 B2 | 6/2007 | Nguyen et al. |
| 7,266,127 B2 | 9/2007 | Gupta et al. |
| 7,281,058 B1 | 10/2007 | Shepherd et al. |
| 7,296,205 B2 | 11/2007 | Curcio et al. |
| 7,379,653 B2 | 5/2008 | Yap et al. |
| 7,412,149 B2 | 8/2008 | Cohen et al. |
| 7,433,946 B2 | 10/2008 | Shen et al. |
| 7,447,978 B2 | 11/2008 | Hannuksela |
| 7,475,299 B1 * | 1/2009 | Brenes et al. ............ 714/704 |
| 7,477,653 B2 | 1/2009 | Smith et al. |
| 7,490,344 B2 | 2/2009 | Haberman et al. |
| 7,584,404 B2 | 9/2009 | Kozintsev et al. |
| 7,610,606 B2 | 10/2009 | Carlucci et al. |
| 7,620,294 B2 | 11/2009 | Green et al. |
| 7,681,101 B2 | 3/2010 | Oran et al. |
| 7,725,797 B2 | 5/2010 | Ver Steeg |
| 7,729,590 B2 | 6/2010 | Kosugi |
| 7,877,660 B2 | 1/2011 | VerSteeg |
| 7,899,046 B2 | 3/2011 | VerSteeg |
| 2001/0000540 A1 | 4/2001 | Cooper et al. |
| 2001/0025378 A1 | 9/2001 | Sakamoto et al. |
| 2002/0004841 A1 | 1/2002 | Sawatari |
| 2002/0010938 A1 | 1/2002 | Zhang et al. |
| 2002/0019853 A1 | 2/2002 | Vange et al. |
| 2002/0056107 A1 | 5/2002 | Schlack |
| 2002/0057367 A1 | 5/2002 | Baldock |
| 2002/0057713 A1 * | 5/2002 | Bagchi et al. ............ 370/468 |
| 2002/0067909 A1 | 6/2002 | Iivonen |
| 2002/0087976 A1 | 7/2002 | Kaplan et al. |
| 2002/0126711 A1 | 9/2002 | Robinett et al. |
| 2002/0129129 A1 | 9/2002 | Bloch et al. |
| 2002/0163918 A1 | 11/2002 | Cline |
| 2002/0184637 A1 | 12/2002 | Perlman |
| 2003/0002849 A1 | 1/2003 | Lord |
| 2003/0007507 A1 | 1/2003 | Rajwan et al. |
| 2003/0007724 A1 | 1/2003 | Gummalla et al. |
| 2003/0014752 A1 | 1/2003 | Zaslavsky et al. |
| 2003/0025786 A1 | 2/2003 | Norsworthy |
| 2003/0025832 A1 | 2/2003 | Swart et al. |
| 2003/0048808 A1 | 3/2003 | Stahl et al. |
| 2003/0076850 A1 | 4/2003 | Jason, Jr. |
| 2003/0133458 A1 | 7/2003 | Sato et al. |
| 2003/0156218 A1 | 8/2003 | Laksono |
| 2003/0158899 A1 | 8/2003 | Hughes |
| 2003/0188253 A1 | 10/2003 | Kauschke et al. |
| 2003/0188311 A1 | 10/2003 | Yuen et al. |
| 2003/0196211 A1 | 10/2003 | Chan |
| 2003/0200551 A1 | 10/2003 | Kang |
| 2003/0217365 A1 | 11/2003 | Caputo |
| 2003/0236903 A1 | 12/2003 | Piotrowski |
| 2004/0071128 A1 | 4/2004 | Jang et al. |
| 2004/0111470 A1 | 6/2004 | Poulsen et al. |
| 2004/0133907 A1 | 7/2004 | Rodriguez et al. |
| 2004/0184776 A1 | 9/2004 | Inoue et al. |
| 2004/0204945 A1 | 10/2004 | Okuda et al. |
| 2004/0226044 A1 | 11/2004 | Goode |
| 2004/0260814 A1 | 12/2004 | Budge et al. |
| 2005/0078698 A1 | 4/2005 | Araya et al. |
| 2005/0155075 A1 | 7/2005 | Crichton |
| 2005/0166242 A1 | 7/2005 | Matsumoto et al. |
| 2005/0172326 A1 | 8/2005 | Jerding et al. |
| 2005/0190781 A1 | 9/2005 | Green et al. |
| 2005/0198367 A1 | 9/2005 | Ettikan |
| 2005/0204251 A1 | 9/2005 | Moon et al. |
| 2005/0228892 A1 | 10/2005 | Riley et al. |
| 2005/0249231 A1 | 11/2005 | Khan |
| 2005/0289618 A1 | 12/2005 | Hardin |
| 2005/0289623 A1 | 12/2005 | Midani et al. |
| 2006/0013247 A1 | 1/2006 | Kotch et al. |
| 2006/0025149 A1 | 2/2006 | Karaoguz et al. |
| 2006/0074968 A1 | 4/2006 | Gyetko |
| 2006/0080707 A1 | 4/2006 | Laksano |
| 2006/0083263 A1 | 4/2006 | Jagadeesan et al. |

(56) References Cited

U.S. PATENT DOCUMENTS

| | | | |
|---|---|---|---|
| 2006/0112325 | A1 | 5/2006 | Ducheneaut et al. |
| 2006/0188025 | A1 | 8/2006 | Hannuksela |
| 2006/0189272 | A1* | 8/2006 | Willenegger et al. ........ 455/3.01 |
| 2006/0212917 | A1 | 9/2006 | Boucher et al. |
| 2006/0236358 | A1 | 10/2006 | Liu et al. |
| 2006/0242669 | A1 | 10/2006 | Wogsberg |
| 2007/0044130 | A1 | 2/2007 | Skoog |
| 2007/0204320 | A1 | 8/2007 | Wu et al. |
| 2007/0268899 | A1 | 11/2007 | Cankaya |
| 2008/0192839 | A1 | 8/2008 | Gahm et al. |
| 2008/0253369 | A1 | 10/2008 | Oran et al. |
| 2009/0327832 | A1* | 12/2009 | Ichihara ........................ 714/752 |
| 2011/0219281 | A1* | 9/2011 | Wang et al. ................... 714/749 |
| 2012/0005558 | A1* | 1/2012 | Steiner et al. ................. 714/773 |

FOREIGN PATENT DOCUMENTS

| | | |
|---|---|---|
| WO | WO 0019693 | 4/2000 |
| WO | WO 2008/033644 | 3/2008 |
| WO | WO 2008/033645 | 3/2008 |
| WO | WO 2008/100725 | 8/2008 |

OTHER PUBLICATIONS

Kaindl, M.; Hindelang, T., "Estimation of bit error probabilities using a priori information," Global Telecommunications Conference, 1999. GLOBECOM '99 , vol. 5, no., pp. 2422,2426 vol. 5, 1999.*

Baruffa, G.; Micanti, P.; Frescura, F., "Error Protection and Interleaving for Wireless Transmission of JPEG 2000 Images and Video," Image Processing, IEEE Transactions on , vol. 18, No. 2, pp. 346,356, Feb. 2009.*

Adamson et al., Negative-Acknowledgment (NACK)—Oriented Reliable Multicast (NORM) Building Blocks (RFC 3941), Nov. 2004, 37 pages.

Chesterfield, J., et al., "RTCP Extensions for Single-Source Multicast Sessions", draft-ietf-avt-rtcpssm-11, Mar. 6, 2006, 56 pages.

Duffy, "Riverstone Recasts Multicast Video," 3 pages, Aug. 5, 2002.

Lehman et al., Active Reliable Multicast (ARM), 1998, IEEE, pp. 581-589.

Luby, M., et al., "Compact Forward Error Correction (FEC) Schemes", RFC 3695, Feb. 2004, 14 pages.

Luby, M., et al., "Forward Error Correction (FEC) Building Block", RFC 3452, Dec. 2002, 16 pages.

Ott, J., et al., "Extended RTP Profile for RTCP-based Feedback (RTP/AVPF)", draft-ietf-avt-rtcp-feedback-11, Aug. 10, 2004, 53 pages.

PCT International Search Report, PCT/US2007/76264; Jul. 7, 2008, 3 pgs.

PCT International Search Report, PCT/US2008/052907; Jul. 7, 2008, 3 pgs.—Different.

Pendleton, et al., "Session Initiation Package for Voice Quality Report Event," Sipping Working Group, 2006, pp. 1-24.

Rey, J., et al., "RTP Retransmission Payload Format", RFC 4588, Jul. 2006, 24 pages.

Rosenberg, J., et al., "Registration of parityfec MME types", RFC 3009, Nov. 2000, 11 pgs.

Schulzrinne, et al., RPT: A Transport Protocol for Real-Time Applications, RFC 3550, Network Working Group, Jul. 2003, pp. 1-89.

Watson, M., "Basic Forward Error Correction (FEC) Schemes", draft-ietf-rmt-bb-fec-basic-schemes-revised-02, Mar. 3, 2006, 25 pages.

* cited by examiner

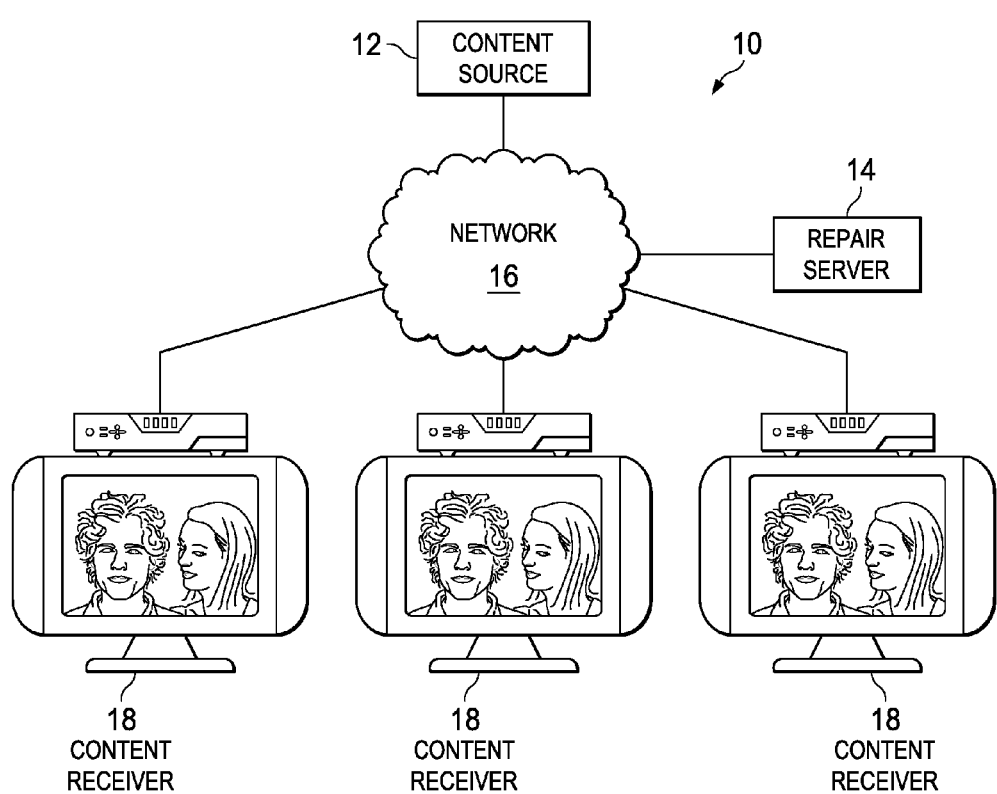

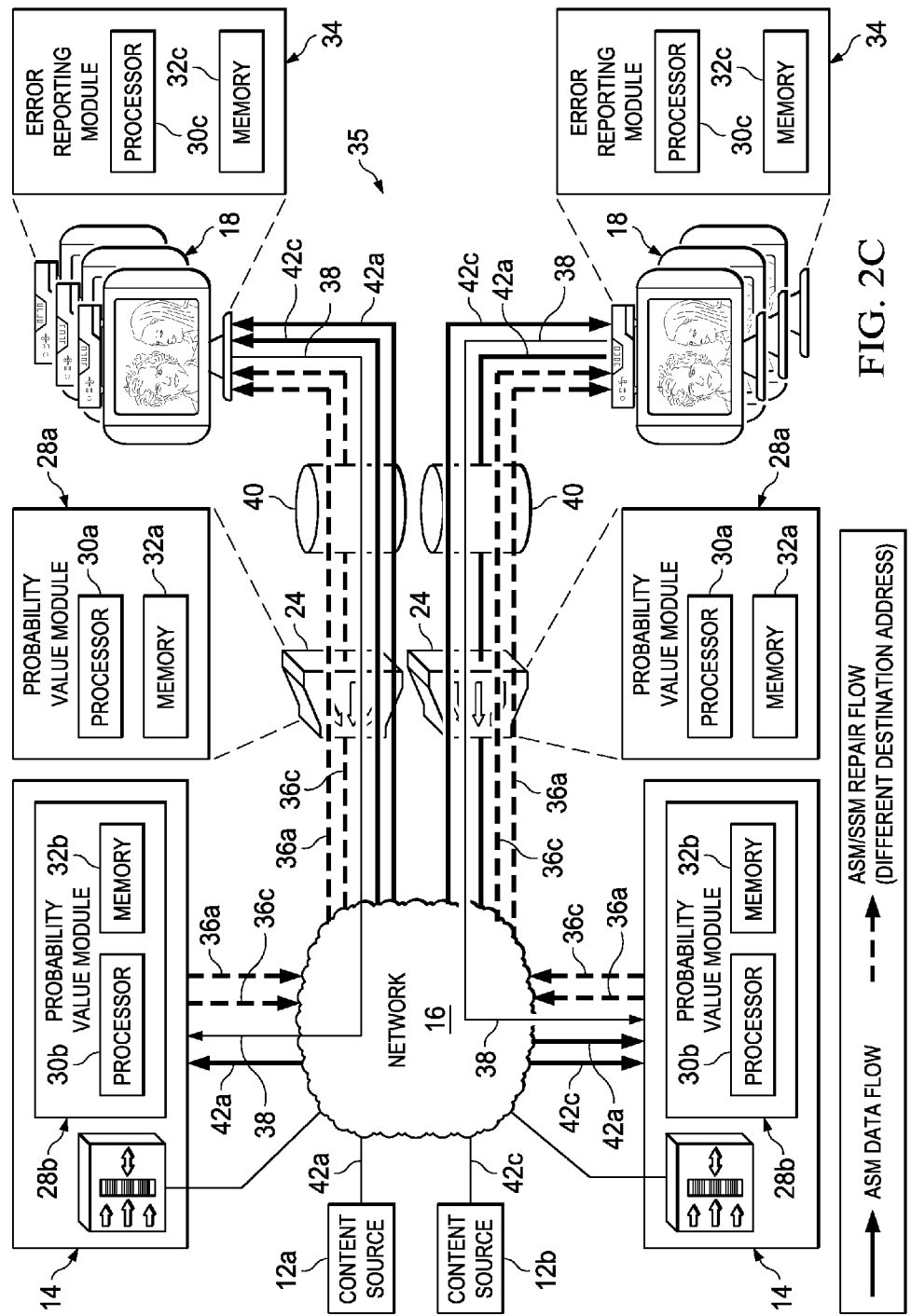

SYSTEM AND METHOD FOR MULTICAST ERROR RECOVERY USING SAMPLED FEEDBACK

TECHNICAL FIELD

This disclosure relates in general to the field of communications and, more particularly, to providing multicast error recovery using sampled feedback.

BACKGROUND

End users have more media and communications choices than ever before. A number of prominent technological trends are currently afoot (e.g., more computing devices, more online video services, more Internet video traffic), and these trends are changing the media delivery landscape. Separately, these trends are pushing the limits of capacity and, further, degrading the performance of video, where such a degradation creates frustration amongst end users, content providers, and service providers. While video information is seemingly ubiquitous, accessing this video information has proven challenging, as users are forced to navigate through a complex web of devices, networks, billing models, etc. In many instances, the video data sought for delivery is dropped, fragmented, delayed, or simply unavailable to certain end users. Hence, there is a challenge in providing an appropriate response strategy for these problematic network scenarios.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1 is a simplified block diagram of a communication system in accordance with one embodiment of the present disclosure;

FIG. 2C is a simplified block diagram illustrating possible example details associated with the communication system in accordance with one embodiment of the present disclosure;

DETAILED DESCRIPTION OF EXAMPLE EMBODIMENTS

Overview

Figure 2A:
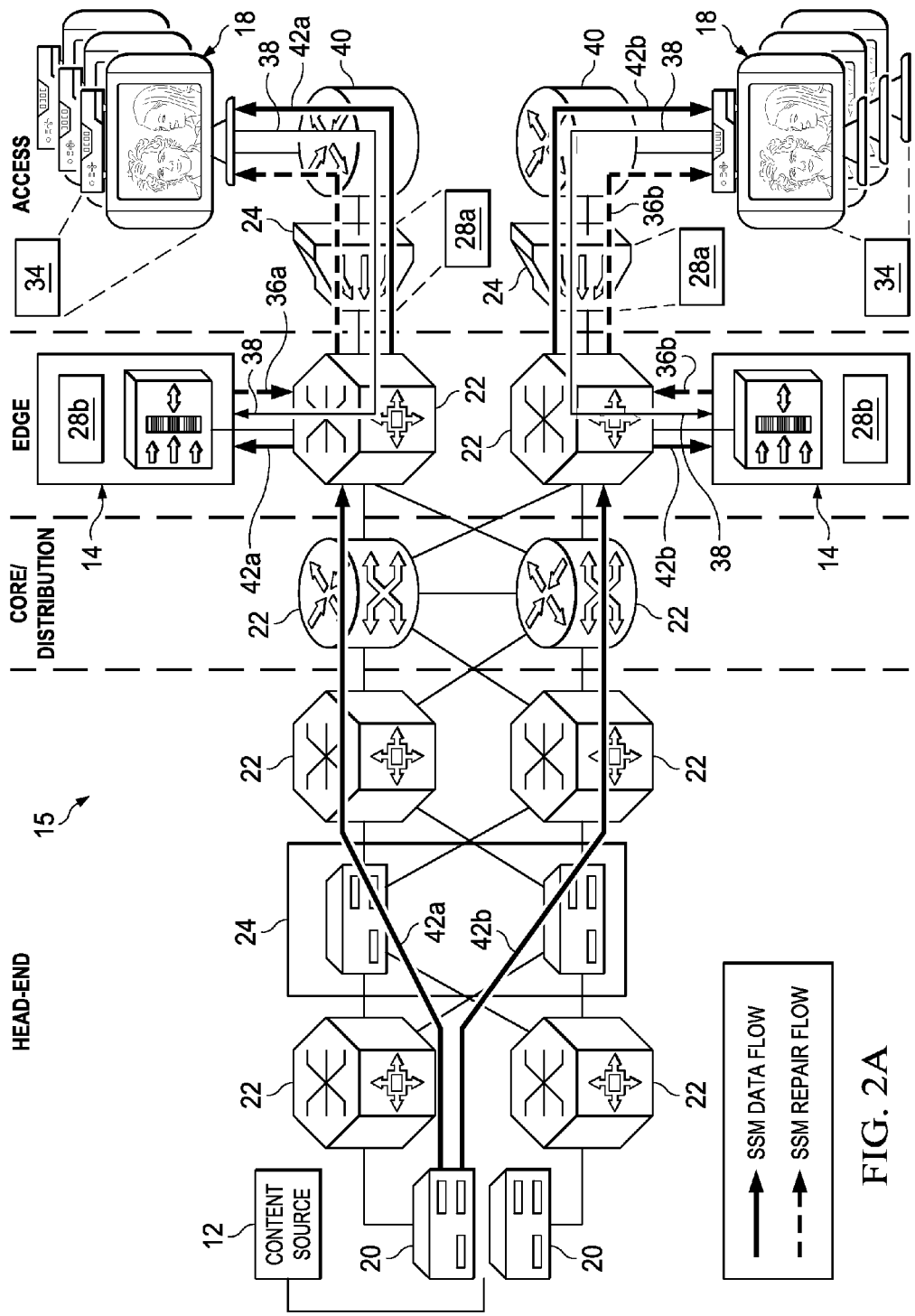
FIG. 2A is a simplified block diagram illustrating possible example details associated with the communication system in accordance with one embodiment of the present disclosure.

A method is provided in one example and includes receiving a data stream that includes an error code probability; detecting an error in the data stream; and determining whether to generate an error signal for the error in the data stream based on the error code probability being compared to a threshold value. In more particular embodiments, the error code probability may be based on a total number of network elements that receive the data stream. In addition, more specific methodologies may include generating a number to be used as a basis for the threshold value; and generating the error signal if the error code probability is below the threshold value.

In yet other implementations, the method may include communicating the error signal to a server configured to generate the error code probability, where the error signal can trigger a retransmission for at least one packet identified as being associated with the error of the data stream. In addition, the method may include using the error code probability to determine whether a given network element should report errors detected for incoming data streams. In certain configurations, the error code probability can be determined by a network element that includes a digital subscriber line (DSL) access multiplexer.

In yet other instances, the method may include comparing an actual number of error reports to a maximum number of possible error reports; generating a statistical approximation of a total number of network elements affected by the error; and comparing the statistical approximation against a policy in order to determine whether to send an unsolicited error repair message based on the error.

Example Embodiments

Turning to FIG. 1, FIG. 1 is a simplified block diagram of a communication system 10 for offering multicast error recovery using sampled feedback in accordance with one embodiment of the present disclosure. FIG. 1 includes a content source 12, a repair server 14, a network 16, and a set of content receivers 18. Content source 12 is configured to output one or more data streams, where each stream can include a sequence of data packets. Content source 12 may store the data (e.g., media) locally, or receive the data from another server or content source via network 16, via another network, via satellite, via cable, or via any other appropriate communication link.

Content source 12 may communicate the data packets to any combination of different content receivers 18 using network 16. One or more data packets may be dropped, lost, and/or delayed (for any number of different reasons) at different points along the network paths from content source 12 to content receivers 18. Content receivers 18 can be reflective of any device that receives the data packets. Repair server 14 is configured to receive and cache the data packets sent to content receivers 18 by content source 12. Repair server 14 can be any network element configured to perform these operations and, further, be inclusive of repair points, retransmission servers, etc. Any content receiver 18 that does not successfully receive any of the data packets can send an error message (e.g., a negative acknowledge (NACK) signal) to repair server 14. Repair server 14 may use a hybrid packet repair scheme to dynamically send different types of unicast retransmission packets, multicast retransmission packets, and/or forward error correction (FEC) packets according to the characteristics of the error message(s) received from content receiver(s) 18. The actual retransmission of the missing or errored packet could be (for example) a unicast message to specific devices, or a retransmission of the missed or errored packet via multicast.

For purposes of illustrating certain example techniques of communication system 10, it is important to understand how typical communications may traverse the network. The following foundational information may be viewed as a basis from which the present disclosure may be properly explained. A problem with multicast error repair can occur when a missing or errored multicast data packet is detected by a large number of receiving devices.

Hence, single errors that result in missing or errored multicast packets may affect the multicast data stream received by multiple content receivers 18. This can be attributed to the "1-to-many" nature of multicast streams. The probability that the missed or errored packet affects a high percentage of receiving devices would be higher in networks with large shared transmission media because an unrecoverable transmission error over shared media will generally affect all receiving stations. While multicast streams generally use at least small network segments using shared transmission media, multicast errors on networks with large segments of shared transmission media errors (e.g., Hybrid Fiber Coax networks) can pose severe multicast recovery problems. Further, while errors in some types of multicast streams may reasonably be ignored, some applications using multicast streams may require reliable delivery methods. Applications that require reliable multicast delivery could include software distribution to remote devices and video distribution to devices that would store video for future playback (such as for local ad insertion).

When large numbers of receiving devices send a unicast message to request a retransmission of the missing or errored data packet, an avalanche of messages can cause network problems including network congestion, latency, and packet loss. Some of the retransmission requests may be blocked by the resulting network congestion and, subsequently, cause further bandwidth to be consumed by unicast retries of these retransmission requests. The congestion, latency, and packet loss can adversely affect network traffic, services, and ultimately inhibit performance for end users.

In accordance with one example implementation, communication system 10 can resolve the aforementioned issues (and potentially others) associated with multicast error recovery. More specifically, a multicast distribution source can proactively set the maximum number of multicast error reporters on each multicast data stream by setting a probability value in the multicast data stream. The probability value may travel in-band, or out-of band. Each multicast receiver can use the probability value to self-select whether the receiver should report errors detected in the multicast data stream. For example, if up to approximately fifty (50) content receivers 18 are desired to report multicast errors and if there are approximately one thousand (1000) total content receivers that are receiving the multicast data stream, then a probability field in the stream may be set to 0.05. The probability field can be set by a distribution source that is feeding the multicast data stream to content receivers 18.

Each content receiver 18 can be configured to apply the probability value to an internally generated random number (or pseudo-random number) that can be associated with some threshold value (which is a broad term that simply reflects any suitable metric, characteristic, etc. to be used in assisting in the determination as to whether to send an error signal). In an embodiment, if the internally generated random number is lower than the probability field (i.e., 0.05), then the multicast receiver will report the error. If the internally generated random number were higher than the probability field, then the multicast receiver would not report the error. In an alternate embodiment, if the internally generated random number is higher than the probability field (i.e., 0.05), then the multicast receiver would not report the error. If the internally generated random number were lower than the probability field, then the multicast receiver would report the error.

Hence, the configuration of communication system 10 can offer a method that provides a probability-based mechanism to enable partial sampling of multicast receivers (often referred to as 'canaries') to request a retransmission of errored (or missing) packets. Note that errored (or missing) packets typically engender excess error recovery messages propagating in the network, where such recovery messages can lead to network congestion problems. Such scenarios are effectively avoided by employing the probability-based partial sampling method discussed herein.

The architecture of FIG. 1 also allows the selected error reporters to send the NACK (e.g., immediately) without waiting for a backoff interval. In certain scenarios, sampling stations would be selected based on probability methods that could be used by receiving stations for self-selection (i.e., selecting themselves as sampling stations) to provide the appropriate feedback. Note that many systems use a backoff interval, where each receiver uses a randomized backoff timer within the specified interval. This is often combined with server-based NACK suppression, once the initial NACKs have been received. In contrast, the mechanisms of communication system 10 do not require either the randomized backoff interval and, further, do not require the server-based NACK suppression, once the initial NACKs are received. Thus, the implementation of communication system 10 enables an effective recovery from errored or missing packets, which affect a large number of receiving stations. This would prevent the problematic upstream issue (e.g., an egregious, high-volume of recovery messages being received) when large numbers of receiving stations attempt to request the same retransmission of the errored or missing packets.

Figure 2B:
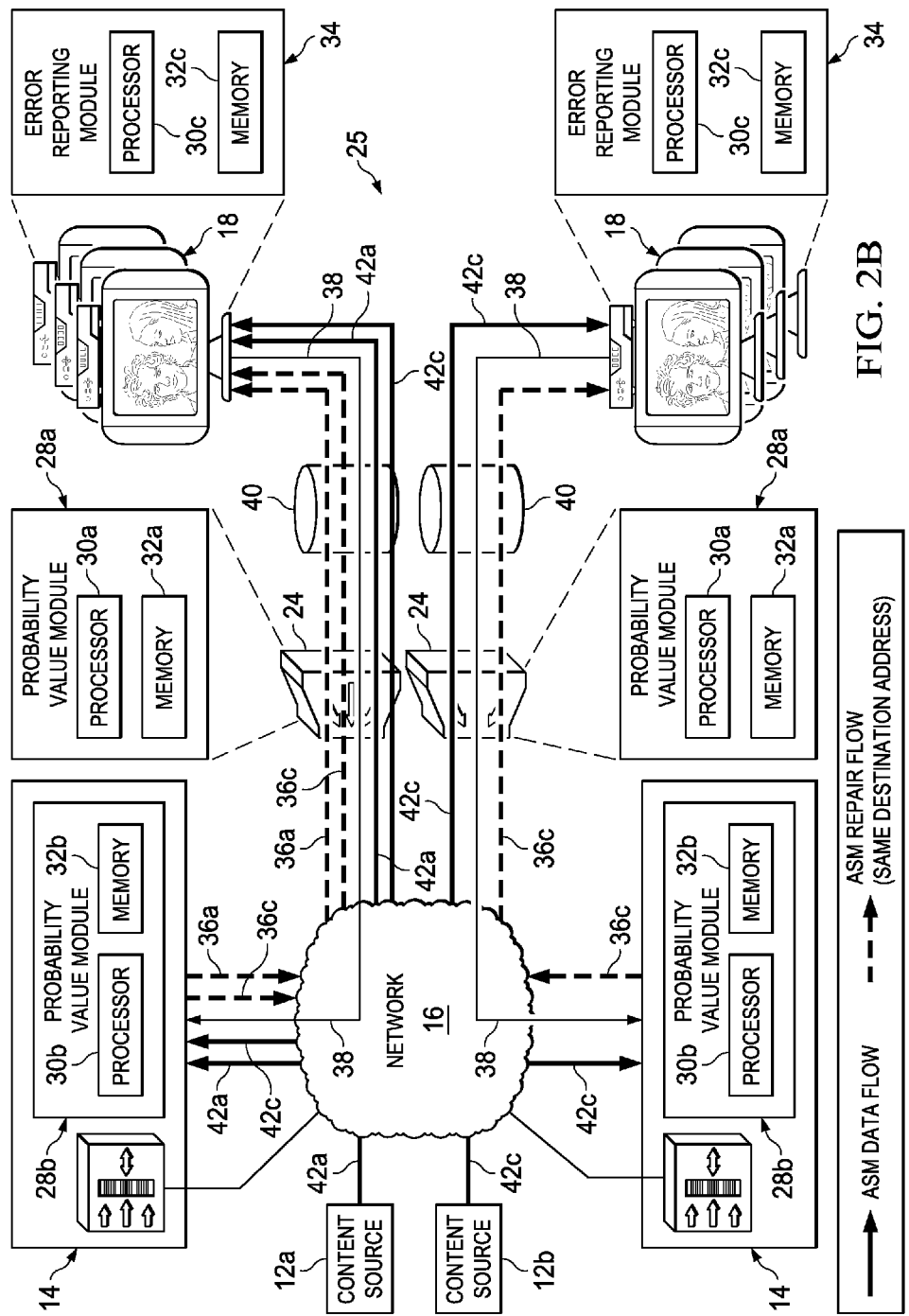
FIG. 2B is a simplified block diagram illustrating possible example details associated with the communication system in accordance with one embodiment of the present disclosure.

Turning to FIG. 2A, FIG. 2A is a simplified block diagram illustrating one possible set of details associated a communication system 15, where a source specific multicast (SSM) data flow and SSM repair flow are depicted. [Note that the communication systems of FIGS. 2A-2C reflect similar properties and capabilities associated with communication system 10 of FIG. 1. In a generic sense, these communication systems of FIGS. 2A-2C are representative of the possible implementations of the present disclosure and/or communication system 10.] FIG. 2A includes content source 12, repair servers 14, content receivers 18, a set of encoders 20, a set of routers 22, a set of headends 24 (e.g., that may include DSL access multiplexers), and an instance of customer premise equipment (CPE) 40. In an embodiment, headends 24 may each contain a probability value module 28a and/or repair servers 14 may each contain probability value module 28b. Each content receiver 18 may contain an error reporting module 34. Probability value modules 28a and 28b can generate a probability value, as discussed herein. Error reporting module 34 can generate a random number (or pseudo-random number), and then compare the number to the probability value to determine if an error message should be sent.

Note that the term 'error code probability' is a broad term inclusive of any type of data segment, packet field, byte allocation, flag, numeric indicator, metric, object or element that can offer information related to any appropriate error characteristic. Along similar lines, the term 'error' is also broad and may be associated with any type of packet error, dropped packet, latency characteristic, missing packet, incomplete packet, transmission or reception defect, addressing deficiency, etc. Hence, the subsequent 'error signal' generated (to identify, describe, signal, etc. the error) could be any message, packet flow, flag, signal, indicator, data segment, object, element, etc. that would by associated with such an error.

In one example, CPE 40 can be any terminal and associated equipment located at a subscriber's premises and, for example, connected to a carrier's telecommunication channel(s) at a demarcation point. The demarcation point may be a point established in a building or complex to separate customer equipment from the equipment located in either the distribution infrastructure or a central office of a service provider. The term "CPE" generally includes devices such as routers, switches, residential gateways, fixed mobile convergence products, home networking adaptors, internet access gateways, private branch exchanges, etc.

Content source 12 can be configured to transmit one or more SSM data streams (e.g., a set of data streams 42a and 42b) to headends 24. Headends 24 can be configured to multicast a data stream to content receivers 18. If an error occurs in the data stream, an error signal 38 may be communicated to repair server 14. Repair server 14 may communicate a SSM repair data stream 36a or 36b to content receiver(s) 18. Repair server 14 may use a hybrid packet repair scheme to dynamically send different types of unicast retransmission packets, multicast retransmission packets, and/or FEC packets according to the characteristics of the error message(s) received from content receiver(s) 18.

The term 'data stream', as used herein, includes any type of packet exchange, which may be related to any type of video, numeric, voice, media, script data, or any type of source or object code, or any other suitable information in any appropriate format that may be communicated from one point to another in the network. This can include routine network communications, unicast communications, point-to-point communications, multicast communications, or any other suitable network communication in which an error may be discovered.

SSM (sometimes referred to as single source multicast) offers a method of delivering multicast packets in which the packets being delivered to a receiver are those originating from a specific source address requested by the receiver. By limiting the source, SSM can reduce demands on a network and, further, may improve security. SSM designates that the receiver specify the source address and generally excludes the use of the (*,G) join for multicast groups in RFC 3376 (which is possible in IPv4's IGMPv3 and IPv6's MLDv2). In addition to the receiver expressing interest in traffic for a multicast address, the receiver can express interest in receiving traffic from a specific source sending to that multicast address. As a result, the network is relieved of discovering many multicast sources, thus reducing the amount of multicast routing information that the network can maintain.

In terms of the infrastructure of the present disclosure, network 16 represents a series of points or nodes of interconnected communication paths for receiving and transmitting packets of information that propagate through the architecture. Network 16 offers a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. Network 16 may implement a UDP/IP connection and use a TCP/IP communication language protocol in particular embodiments of the present disclosure. Further, network 16 may implement any other suitable communication protocol for transmitting and receiving data packets within the architecture. Data, as used herein in this document, refers to any type of numeric, voice, video, media, or script data, or any type of source or object code, or any other suitable information in any appropriate format that may be communicated from one point to another.

In one particular instance, the architecture of the present disclosure can be associated with a service provider digital subscriber line (DSL) deployment. In other examples, the architecture of the present disclosure would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures. The architecture of the present disclosure may include a configuration capable of transmission control protocol/internet protocol (TCP/IP) communications for the transmission and/or reception of packets in a network. The architecture of the present disclosure may also operate in conjunction with a user datagram protocol/IP (UDP/IP) or any other suitable protocol, where appropriate and based on particular needs.

Turning to FIG. 2B, FIG. 2B is a simplified block diagram illustrating one possible set of details associated with a communication system 25, where a source multicast (ASM) data flow and an ASM repair flow are depicted. FIG. 2B includes content sources 12a and 12b, repair servers 14, network 16, content receivers 18, headends 24, and CPE 40. In an embodiment, headends 24 may each contain probability value module 28a. Probability value module 28a may include a processor 30a and memory 32a. In another embodiment, repair servers 14 may each contain probability value module 28b. Probability value module 28b may include a processor 30b and memory 32b. Each content receiver 18 may contain error reporting module 34, which may include a processor 30c and memory 32c.

Content sources 12a and 12b may each transmit one or more ASM data streams (e.g., data streams 42a and 42c) to headends 24. Headends 24 are configured to multicast data stream 42a and/or data stream 42c to content receivers 18. If an error occurs in data stream 42a and/or data stream 42c, error signal 38 (i.e., NACK signal) may be sent to repair server 14. Repair server 14 may communicate an ASM repair data stream 36a or 36c to content receiver(s) 18 that sent error signal 38. Repair server 14 may use a hybrid packet repair scheme to dynamically send different types of unicast retransmission packets, multicast retransmission packets, and/or FEC packets according the characteristics of the error message(s) received from content receiver(s) 18.

In ASM, content receiver(s) 18 can express interest in traffic for a multicast address. The multicast network discovers multicast sources sending to that address and routes data from sources to interested content receiver(s) 18. ASM is generally suited to groupware applications, where participants in the group want to be aware of other participants, and the list of participants is not known in advance. ASM is the more traditional form of multicast where multiple senders (e.g., content source 12a and 12b) can send on the same group or channel, as opposed to source-specific multicast where a single particular source is specified.

Repair servers 14, content receivers 18, and headends 24 are network elements that can facilitate multicast flows between hosts (e.g., content source 12) and/or sources in a given network (e.g., network 14). For example, headends 24 can include a cable television headend (e.g., a master facility for receiving television signals for processing and distribution over a cable television system), a gateway (i.e., for telecommunications), a single master antenna television headend, (SMATV) (e.g., used for hotels, motels, and commercial properties), etc. Content receivers 18 may be personal computers (PCs), set-top boxes (STBs), personal digital assistants (PDAs), voice over Internet protocol (VoIP) phones, Internet connected televisions, cellular telephones, smartphones, consoles, proprietary endpoints, laptops or electronic notebooks, i-Phones, iPads, Google Droids, any other type of smartphone, or any other device, component, element, or object capable of initiating data exchanges within communication system 10.

More generally, and as used herein in this Specification, the term 'network element' is meant to encompass any of the aforementioned elements, as well as routers, switches, cable boxes, gateways, bridges, loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, repair servers 14, content receivers 18, and/or headends 24 include software to achieve (or to foster) the error recovery activities discussed herein. This could include the implementation of instances of probability value modules 28 and/or error reporting modules 34. Additionally, each of these elements can have an internal structure (e.g., a processor, a memory element, etc.) to facilitate some of the operations described herein. In other embodiments, these error recovery activities may be executed externally to these elements, or included in some other network element to achieve the intended functionality. Alternatively, repair servers 14, content receivers 18, and/or headends 24 may include software (or reciprocating software) that can coordinate with other network elements in order to achieve the error recovery activities described herein. In still other embodiments, one or several devices may include any suitable algorithms, hardware, software, components, modules, interfaces, or objects that facilitate the operations thereof.

Turning to FIG. 2C, FIG. 2C is a simplified block diagram illustrating one possible set of details associated with a communication system 35, where an ASM data flow and ASM/SSM repair flow are depicted. FIG. 2C includes content sources 12a and 12b, repair servers 14, network 16, content receivers 18, headends 24, and CPE 40. In an embodiment, headends 24 may each contain probability value module 28a and/or repair servers 14 may each contain probability value module 28b. Each content receiver 18 may include error reporting module 34.

Content sources 12a and 12b each transmit one or more ASM data streams (e.g., data streams 42a and 42c) to headends 24. Headends 24 are configured to multicast the data stream 42a and/or data stream 42c to content receivers 18. If an error occurs in data stream 42a and/or data stream 42c, error signal 38 (i.e., NACK signal) may be sent to repair server 14. Repair server 14 may communicate an ASM/SSM repair data stream 36a or 36c to content receiver(s) 18 that sent error signal 38. Repair server 14 may use a hybrid packet repair scheme to dynamically send different types of unicast retransmission packets, multicast retransmission packets, and/or FEC packets according the characteristics of the error message(s) received from content receiver(s) 18.

In operation of an example embodiment using probability module 28a, a multicast distribution source (e.g., headend 24) is configured to set a maximum number of multicast error reporters on each data stream by setting a probability value in a multicast data stream. In another embodiment, repair server 14 can be configured to use probability module 28b to set the probability value in the multicast data stream. Each content receiver 18 can use the probability value to self-select whether content receiver 18 should report errors detected in the multicast data stream. For example, if up to approximately twenty-five (25) content receivers 18 are desired to report multicast errors within a portion of a network that contains one thousand 1000 content receivers, the distribution source feeding content receivers 18 may set a probability field in the stream to 0.025. Each content receiver 18 applies the probability value to an internally generated random number. If the random number satisfies the probability value (e.g., is below the probability value, or alternatively is above the probability value), then content receiver 18 auto-selects itself as an error reporter. In this example, 2.5% of the one thousand (1000) total content receivers 18 may auto-select themselves as error reporters (twenty-five (25) error reporters). If selected error reporters detect the error, then twenty-five (25) content receivers 18 send an error signal when the error is detected.

In another example, 5 total content receivers 18 can be receiving the multicast data stream. The probability field in the stream may be set to one (1) so all five (5) content receivers 18 send error signal 38 when an error is detected. Even if all five (5) content receivers 18 were to send error signal 38, it is unlikely that network 16 would suffer congestion, latency, and packet loss and, further, that network traffic and services would be adversely affected. In another example, twenty thousand (20,000) total content receivers 18 are receiving the multicast data stream. The distribution source can set a probability field in the stream to 0.0025. Hence, 0.25% of the twenty thousand (20,000) total content receivers 18 auto-select themselves as error reporters (fifty (50) error reporters), and send an error signal when an error is detected.

By using a probability field in the data stream, the complexity of RFC4585/RFC5760 feedback suppression (while still avoiding the error signal implosion problem) may be avoided. In addition, error feedback can occur as soon as the error is detected because there is no need for error reporters to wait for an expiration of a random backoff timer. Further, the feedback target (i.e., repair server 14, content receiver 18, etc.) may know how many reports to be received if the error occurred in various portions of the network. By comparing the actual number of error reports to the maximum number of possible error reports, a given feedback target can get a statistical approximation of the total number of content receivers 18 affected by the error. By comparing this value against a policy (e.g., predetermined and provisioned in any of the network elements discussed herein), the feedback target can make a decision of whether or not to send an unsolicited error repair message (e.g., via multicast). For example, if more than 5% (or some other percentage based on a configurable policy decision) of the error reporters report an error, then the system may send an unsolicited error repair message to content receivers 18 (e.g., via multicast).

In operation, example embodiments of present disclosure may offer a scheme that identifies a hierarchy of repair flows, and a mechanism to control the amount of feedback and error recovery on the flows. For example, a typical deployment scenario may have millions of receivers listening to a flow on a nationwide basis, hundreds of thousands on a citywide basis, thousands on a per-concentrator basis, and a handful on a per node basis. Each of these groupings could have a dedicated repair flow and the receivers have their feedback tuned on a per-repair grouping basis (e.g., each node or receiver could be a content receiver 18 that is connected to repair server 14). Based on the heuristics of the repair feedback, the system can choose to send the repair via the primary repair flow, one or more secondary repair flows, or one or more unicast repair flows.

Further, various methods to elect multiple sampling stations (and allow the content provider to dynamically control the number of sampling stations via a probabilistic method)

enables a self-selection of the sampling stations. Communication system 10 may also have provisions for assigning different downstream multicast channels for the repair, and for assigning receivers to the different repair channels. In an embodiment, a default behavior is to have a single downstream repair channel; however, receivers that share a common link(s) could be grouped together for efficiency.

In an embodiment, a partial sample of content receivers 18 is used to request a retransmission of missing or errored multicast packets. The partial sample of content receivers 18 can actively monitor the received multicast data stream, detect missing or errored multicast packets, and request a retransmission of the missing or errored multicast packet(s). The multicast sender(s) or other device can receive the retransmission request(s) and re-transmit the missing or errored packets to a plurality of receiving stations (e.g., canaries).

In another embodiment, content receivers 18 that are configured to receive the indicated multicast data stream (but are not included in the partial sample of content receivers 18) may not request a retransmission of missing or errored packets. In one example, the selection of content receivers 18 is directly provisioned by a network management system or network control system. Further, the selection of sampling devices can be directly provisioned by a network management system or network control system based on the knowledge of which content receivers 18 are receiving a particular multicast data stream. Communication system 10 could periodically select and update a chosen sample of content receivers 18 based on the knowledge of which content receivers 18 are receiving each stream.

In another embodiment, the selection of content receivers 18 is directly provisioned by a network management system or network control system based on the knowledge of which content receivers 18 are located in a given part of a network. For example, the network management system or network control system may select and update a chosen sample of content receivers 18 based on the network topology and, further, the desire to have one or more samples in each branch of the network. The content receiver population could be divided into N groups: each of which shares a set of links on which errors may occur. The groups may share a single primary downstream repair flow and each group may have a dedicated multicast repair flow. Selected content receivers 18 could be configured to send error notifications on the main repair flow and/or the secondary repair flow.

In another embodiment, the retransmission of missing or errored packets is only sent to the network branch(es) that have content receivers 18 reporting the missing or errored packets. Each branch may have its own multicast retransmission flow, thus isolating the repair flows. In yet another embodiment, certain content receivers 18 make a self-determination that a device should act as a sampling point to request a retransmission of missing or errored packets. This self-determination can be done for the main repair flow and any secondary repair flow.

In another embodiment, the multicast data stream or other transmission method includes information that content receivers 18 use to assist in the self determination that content receiver 18 should act as a sampling point to request a retransmission of missing or errored packets. This information can be updated dynamically by the sender of the data stream, as the number of content receivers 18 change or as network conditions change. The information can be sent on the primary repair flow and each of the secondary repair flows. The primary repair flow may include the total number of content receivers 18, and each of the sub flows may include the number of content receivers 18 on that sub flow.

In yet another embodiment, the multicast data stream (or other transmission method) provides information that content receivers 18 can use to calculate the percentage of receiving devices that should act as a sampling point to request a retransmission of missing or errored packets. In this example, a numeric value that indicates an approximation of the total number of receiving stations (and the approximation of the total number of requested sampling stations) is communicated to each content receiver 18. Using these two values, each content receiver 18 can calculate the probability that it should act as sampling point to request a retransmission of missing or errored packets. These values can apply independent of the main repair flow and each of the sub flows.

In another embodiment, content receivers 18 determine a probability that each content receiver 18 should make a self-determination that each content receiver 18 should act as a sampling point to request a retransmission of missing or errored packets. For example, the number of requested sampling stations may be divided by the number of total content receivers 18 to calculate a probability that a given content receiver 18 may decide that it should act as a sampling point to request a retransmission of missing or errored packets. These values apply independent of the main repair flow and each of the sub flows.

In another embodiment, the multicast data stream (or other transmission method) provides probability information to each content receiver 18 indicating whether each content receiver 18 should act as a sampling point to request a retransmission of missing or errored packets. Information in the multicast data stream may be transmitted to indicate the probability that a given content receiver 18 should act as a sampling point to request a retransmission of missing or errored packets. For example, if the total number of content receivers 18 were two hundred and fifty-five (255), then a value of two hundred and fifty-five (255) would indicate that all content receivers 18 could act as sample points for the indicated multicast data stream. A value of one hundred and twenty eight (128) would indicate that fifty percent (50%) of content receivers 18 would act as sample points. A value of zero (0) would indicate that no (i.e., zero) content receivers 18 would act as sample points.

In yet another embodiment, content receivers 18 use the information provided by the network, along with device-specific or random information, to determine if each content receiver 18 should act as a sampling point to request a retransmission of missing or errored packets. Each content receiver 18 may use this probability information and combine that with an internally generated random number (or other pseudo-random number) to determine if a specific content receiver 18 should act as a sampling point. For example, if a probability field in the stream indicates fifty percent (50%), then each content receiver 18 may create a hash or mask that when combined with selected bits in a MAC address for a specific content receiver 18, would have a fifty (50%) probability that a specific content receiver 18 would act as a sample point. This enables the desired approximate percentage of devices to act as sample points without requiring a network management system to select the individual content receivers 18 that may act as sample points.

Figure 3:
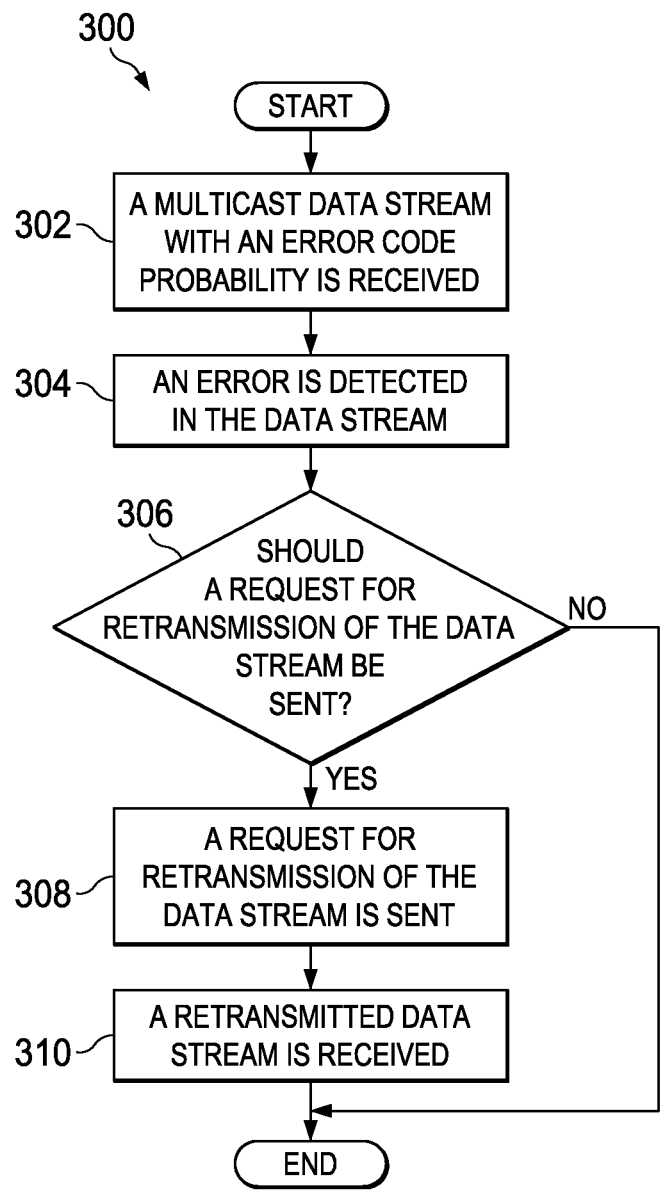
FIG. 3 is a simplified flowchart illustrating potential operations associated with the communication system.

Turning to FIG. 3, FIG. 3 is a simplified flowchart 300 illustrating one potential operation associated with the present disclosure. At 302, a multicast data stream with an error code probability is received. For example, one or more content receivers 18 may receive a data stream with an error code probability from headend 24. At 304, an error is detected in the data stream. For example, one or more content receivers 18 may detect an error in the data stream. At 304, the system determines if a request for retransmission of the data stream should be sent. For example, using an instance of the error code probability module, one or more content receivers 18 may determine that an error signal should be sent. If the system determines that a request for retransmission of the data stream should be sent, then a request for retransmission of the data stream is sent, as illustrated in 308. For example, one or more content receivers 18 may send error signal 38 to repair server 14. At 310, the retransmitted data stream is received.

Figure 4:
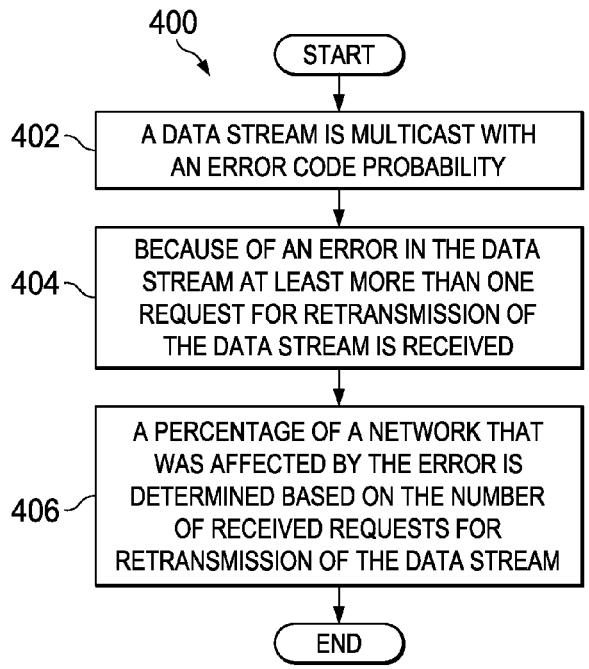
FIG. 4 is another simplified flowchart illustrating potential operations associated with the communication system.

Turning to FIG. 4, FIG. 4 is a simplified flowchart 400 illustrating one potential operation associated with the present disclosure. At 402, a data stream is multicast with an error code probability. For example, headend 24 may multicast a data stream with an error code probability. At 404, because of an error in the data stream, more than one request for a retransmission of the data stream is received. For example, headend 24 or repair server 14 may receive more than one error signal. At 406, a percentage of a network that was affected by the error is determined based on the number of the received requests for retransmissions of the data stream. For example, based on the number of error signals received, headend 24, content receivers 18, or repair server 14 may determine a percentage of a network (e.g., percentage of content receivers 18, percentage of groups of content receivers 18, etc.) that was affected by the error.

Figure 5:
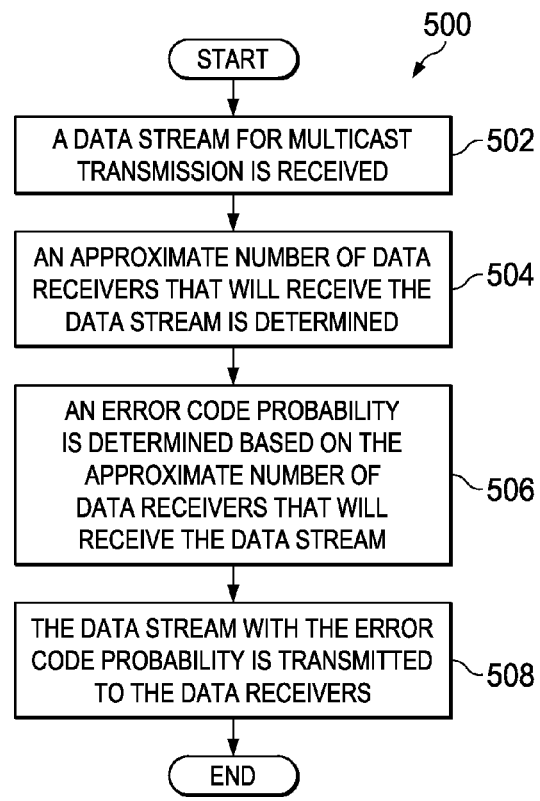
FIG. 5 is another simplified flowchart illustrating potential operations associated with the communication system.

Turning to FIG. 5, FIG. 5 is a simplified flowchart 500 illustrating one potential operation associated with the present disclosure. At 502, a data stream for a multicast transmission is received. For example, a data stream may be received at headend 24 for multicast transmission. At 504, an approximate number of data receivers that will receive the data stream is determined. At 506, an error code probability is determined based on the approximate number of data receivers that will receive the data stream. At 508, the data stream with the error code probability is transmitted to the data receivers. In an embodiment, the error code probability may be transmitted in-band. In another embodiment, the error code probability may be transmitted out-of-band.

Note that in certain example implementations, the multicast error recovery functions outlined herein may be implemented in logic encoded in one or more non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIGS. 2A, 2B, and 2C] can store data used for the operations described herein. This includes the memory element being able to store code (e.g., software, logic, processor instructions, etc.) that can be executed to carry out the activities described in this Specification. A processor can execute any type of instructions associated with the data to achieve the operations detailed herein in this Specification. In one example, the processor [as shown in FIGS. 2A, 2B, and 2C] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Along similar lines, in another embodiment of the present disclosure, a static configuration may be used in order to achieve the error recovery activities discussed herein. For example, routers in a network can be configured in such a way that they know that (S1, G1) and (S2, G2) should be treated differently. This configuration can be done as a source prefix, a group prefix, or both. In another embodiment, a new protocol may be used, where a router in the network can process and maintain network states in order to determine whether to communicate an appropriate error signal to a given network element. Such a mechanism would not necessarily announce the exclusion on a per-pair (S, G) level. In some instances, this error signal propagation may factor in the error code probability discussed previously, or it may be independent of this error code probability metric.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols, communication system 10 may be applicable to other protocols and arrangements. Moreover, the present disclosure is equally applicable to various technologies, aside from DSL architectures, as these have only been offered for purposes of discussion. Along similar lines, communication system 10 can be extended to any communications involving network elements, where the present disclosure is explicitly not confined to unicasting and multicasting activities.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving, at a receiver, a data stream that includes a numeric probability value from a distribution source;
   detecting an error in the data stream by the receiver;
   generating, by the receiver, a numeric threshold value, wherein the threshold value is a pseudo random number; and
   determining whether to generate an error signal for the error in the data stream based on
      the probability value being compared to the threshold value, and
      a predefined condition being satisfied,
   wherein the probability value represents an approximate number of multicast error reporters that may be used for the stream.

2. The method of claim 1, wherein the probability value is based on a total number of network elements that receive the data stream.

3. The method of claim 1,
   wherein the predefined condition includes if the threshold value is higher than the probability value and wherein the error signal is generated when the threshold value is higher than the probability value.

4. The method of claim 1, further comprising:
   communicating the error signal to a server configured to generate the probability value, wherein the error signal triggers a retransmission for at least one packet identified as being associated with the error of the data stream.

5. The method of claim 1, further comprising:
   using the probability value to determine whether a given network element should report errors detected for incoming data streams.

6. The method of claim 1, wherein the probability value is determined by a network element that includes a digital subscriber line (DSL) access multiplexer.

7. The method of claim 1, further comprising:
   comparing an actual number of error reports to a maximum number of possible error reports;
   generating a statistical approximation of a total number of network elements affected by the error; and
   comparing the statistical approximation against a policy in order to determine whether to send an unsolicited error repair message based on the error.

8. Logic encoded in non-transitory media that includes code for execution and when executed by a processor operable to perform operations, comprising:
   receiving, at a receiver, a data stream that includes a probability value from a distribution source;
   detecting an error in the data stream by the receiver; and
   generating, by the receiver, a threshold value, wherein the threshold value is a pseudo random number;
   determining whether to generate an error signal for the error in the data stream based on
      the probability value being compared to the threshold value; and
      a predefined condition being satisfied,
   wherein the probability value represents an approximate number of multicast error reporters that may be used for the stream.

9. The logic of claim 8, wherein the probability value is based on a total number of network elements that receive the data stream.

10. The logic of claim 8, the operations further comprising:
    generating the error signal if the probability value is below the threshold value.

11. The logic of claim 8, the operations further comprising:
    communicating the error signal to a server configured to generate the probability value, wherein the error signal triggers a retransmission for at least one packet identified as being associated with the error of the data stream.

12. The logic of claim 8, the operations further comprising:
    using the probability value to determine whether a given network element should report errors detected for incoming data streams.

13. The logic of claim 8, wherein the probability value is determined by a network element that includes a digital subscriber line (DSL) access multiplexer.

14. The logic of claim 8, the operations further comprising:
    comparing an actual number of error reports to a maximum number of possible error reports;
    generating a statistical approximation of a total number of network elements affected by the error; and
    comparing the statistical approximation against a policy in order to determine whether to send an unsolicited error repair message based on the error.

15. An apparatus, comprising:
    a memory element;
    a processor operable to execute instructions associated with electronic code; and
    an error reporting module operable to interface with the processor such that the apparatus is configured for:
       receiving, a data stream that includes a numeric probability value from a distribution source;
       detecting an error in the data stream by the receiver;
       generating, by the receiver, a numeric threshold value, wherein the threshold value is a pseudo random number; and
       determining whether to generate an error signal for the error in the data stream based on
          the probability value being compared to the threshold value; and
          a predefined condition being satisfied,
       wherein the probability value represents an approximate number of multicast error reporters that may be used for the stream.

16. The apparatus of claim 15, wherein the probability value is based on a total number of network elements that receive the data stream.

17. The apparatus of claim 15, the apparatus being further configured for:
    generating the error signal if the probability value is below the threshold value.

18. The apparatus of claim 15, the apparatus being further configured for:
    communicating the error signal to a server configured to generate the probability value, wherein the error signal triggers a retransmission for at least one packet identified as being associated with the error of the data stream.

19. The apparatus of claim 15, the apparatus being further configured for:

using the probability value to determine whether the apparatus should report errors that are detected for incoming data streams.

20. The apparatus of claim 15, wherein the data stream is a multicast stream, and the apparatus includes a digital subscriber line (DSL) access multiplexer.

* * * * *